May 31, 1955 J. W. DEHN 2,709,771

PULSE COUNTING AND REGISTRATION SYSTEM

Filed Dec. 30, 1949 2 Sheets-Sheet 1

INVENTOR
J. W. DEHN
BY P. C. Smith
ATTORNEY

May 31, 1955 J. W. DEHN 2,709,771

PULSE COUNTING AND REGISTRATION SYSTEM

Filed Dec. 30, 1949 2 Sheets-Sheet 2

INVENTOR
J. W. DEHN
BY P. C. Smith
ATTORNEY.

United States Patent Office 2,709,771

Patented May 31, 1955

2,709,771

PULSE COUNTING AND REGISTRATION SYSTEM

Joseph W. Dehn, Great Neck, N. Y., assignor to Bell Telephone Laboratories, Incorporated, New York, N. Y., a corporation of New York Application December 30, 1949, Serial No. 136,008

15 Claims. (Cl. 315—166)

This invention relates generally to signaling systems and more particularly to arrangements in such systems for detecting and counting signal impulses.

The invention has for its main object to improve gas tube counting chains. In present day signaling systems, such as may be used with automatic telephone systems, continuous improvement is being sought to increase the speed of response of circuits to signals. In the telephone field in particular, continuous energy is expended towards inventing circuits which will respond accurately at a rapid rate to signals such as dial pulses or the like. An exemplary embodiment of the present invention is shown herein as incorporated in an automatic telephone system of the cross-bar type, such as is disclosed in Patent 2,585,904 of February 19, 1952, to A. J. Busch. A skeletonized arrangement of the Busch disclosure is shown in another Patent 2,616,974 of November 4, 1952, to J. W. Dehn. The Dehn disclosure shows some details of an originating register circuit of the cross-bar system, which circuit is shown herein modified to embody the present invention.

The function of an originating register, among others, in the cross-bar system disclosed by Busch and Dehn is to receive, detect, count, and register dial pulse digits transmitted thereto by a calling subscriber during the initiation by the latter of a request for a connection. It is improvement of such counting circuits with which the present invention, in one of its forms, finds utility in improving the speed of response of such originating registers and in simplifying such registers.

Briefly the present invention contemplates a chain of gas-filled tubes for counting impulses and means for applying all impulses to all tubes at the same time. Circuit means is provided for interconnecting said tubes whereby a first impulse will fire only the first tube and whereby the firing of any one tube conditions the other tubes such that only the next succeeding tube fires on the next pulse. Therefore the firing of successive tubes in the chain corresponds to a succession of impulses in a series. Arrangement is made to recycle the chain at the end of a series of impulses such that the chain will count the next series as before for the first series.

The circuit means interconnecting the tubes of the chain whereby successive tubes only are conditioned to fire on successive impulses may be described generally as follows. The input circuit of each tube, whereby said tube is fired, normally has included in shunt therewith an asymmetric impedance element. The impedance of such element is under the control of the next previous tube such that when the next preceding tube is not conducting, the element of the next succeeding tube is at low impedance, thereby preventing the firing of the said next succeeding tube by shunting from the input circuit thereof any impulses impressed thereon. However, whenever a tube is fired, the conducting condition therein conditions the element of the next succeeding tube such that said element is of relatively high impedance, thereby permitting the next impulse to fire said next succeeding tube.

The invention is embodied in a counting arrangement of gas tubes where, in order to count as many as ten impulses, five tubes are provided and are used once or twice depending upon whether the number of pulses in a series is less than six or above five. Upon the receipt of a sixth pulse, for instance, a sixth tube is arranged to fire with the first one again and the combination of tubes one and six firing alters the information supplied by the firing of tube one alone (one pulse) to information representing six pulses. This reduces, in a ten-pulse system, the required number of counting tubes from ten to six.

The circuit embodying the invention provides other features such as tubes for counting initial or prefix digits of one pulse and a tube arrangement for timing inter-digital or inter-series pauses.

Other features and arrangements of the invention will be apparent to those skilled in the art as a result of subsequent detailed description of the arrangements shown herein as exemplary of the application of the principles of the invention.

The drawings accompanying this disclosure may be described generally as follows:

Figs. 1 and 2 combined show parts of a cross-bar originating register embodying the present invention;

Fig. 1 shows the pulse detecting and counting circuits embodying the invention; and, Fig. 2 shows conventional circuit means for registering the digits counted.

GENERAL DESCRIPTION

The present invention is herein disclosed as embodied in an automatic telephone system such as disclosed in the Busch patent. Busch discloses in detail a crossbar system wherein originating register circuits are used for transmitting dial tone to calling subscribers, counting pulses of called digits, registering the called digits, and seizing an idle marker circuit for the purpose of having such a marker complete the desired connection. Since the present invention relates particularly to pulse counting and registering circuits, only certain portions of an originating register circuit have been disclosed and described herein.

The Dehn patent discloses a skeletonized arrangement of the Busch disclosure including an originating register circuit in some detail. The Dehn and Busch disclosures may be referred to for details omitted from the present description as unnecessary for a complete understanding of the present invention.

As may be obtained from the Busch or Dehn disclosure, the general sequence of events during the originating of a call by a subscriber is as follows:

(1) The calling subscriber lifts his receiver, thereby seizing an idle marker circuit and automatically informing the seized marker that a dial tone connection is desired;

(2) The seized marker tests for and seizes an idle originating register circuit;

(3) The marker interconnects the calling line with the seized originating register circuit over the crossbar switch trains and then the marker releases;

(4) The originating register transmits dial tone to the calling subscriber;

(5) The calling subscriber dials the digits of the called number or other desired destination;

(6) The originating register receives, follows, and counts the pulses of each digit and registers such digits;

(7) When sufficient digits have been registered therein, the originating register seizes an idle marker circuit and transfers thereto, among other items of information pertaining to the call, the digits so registered; and (8) The marker, when it has received all of the information from the originating register, releases the originating register, completes the call, and then releases itself.

Since the present invention is embodied only in circuits of an originating register, in so far as the present disclosure is concerned, the subsequent description will not cover items (1), (7) and (8) above. Such matters are fully dealt with by Busch and Dehn and are not necessary to the present description.

DETAILED DESCRIPTION

*Seizure of originating register*

Figure 1:
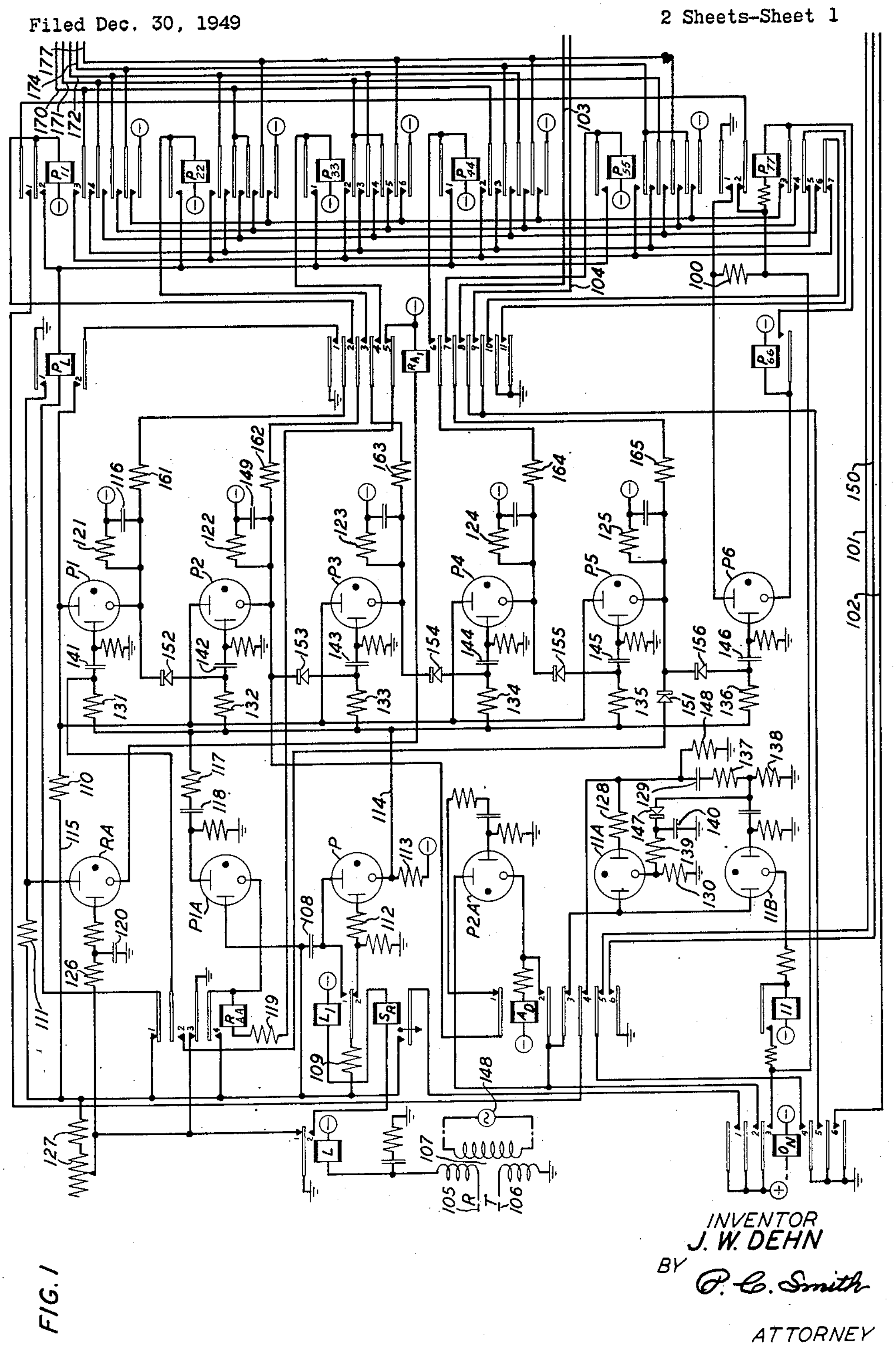
Figure 2:
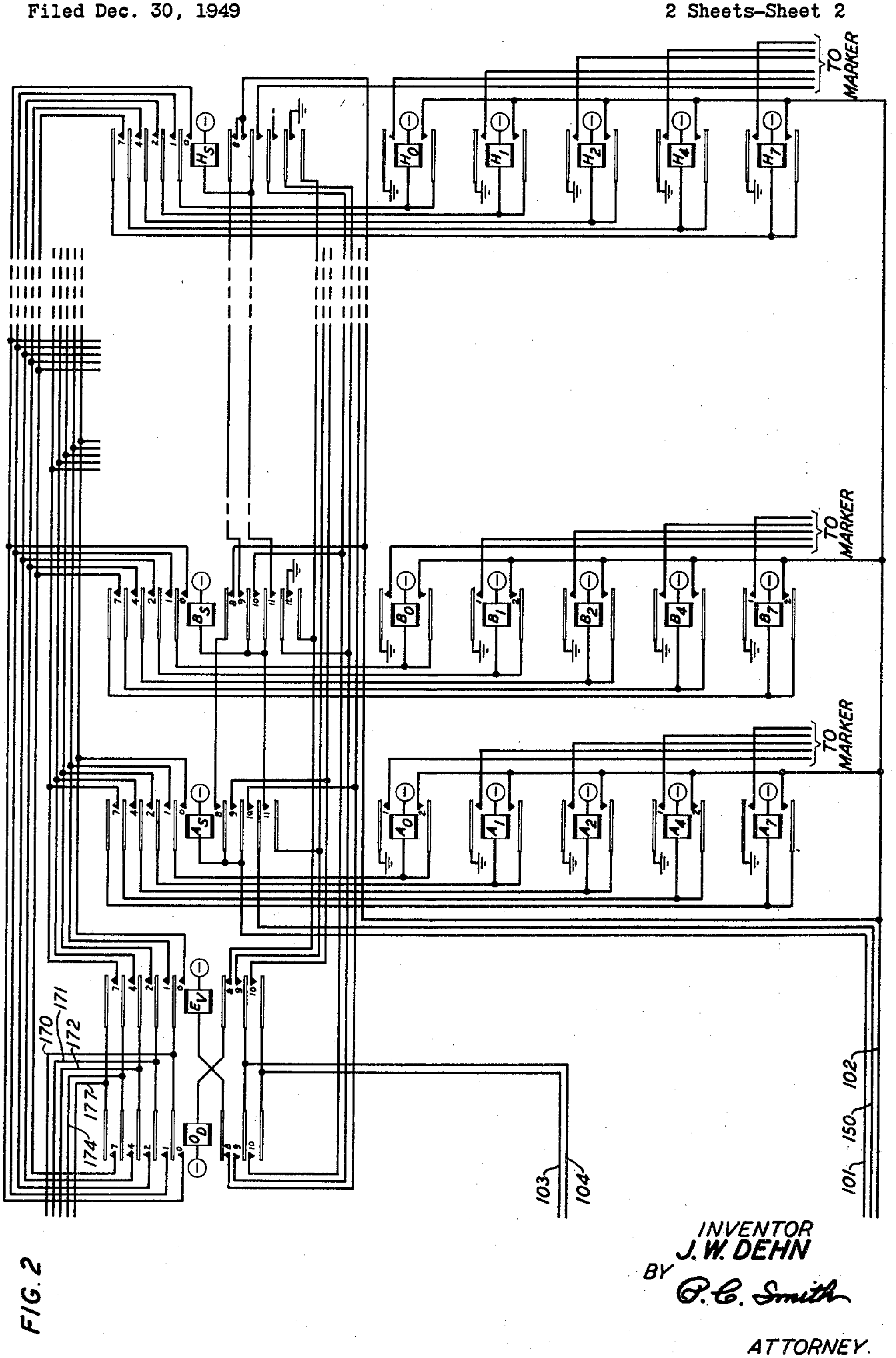

When the marker seizes an idle originating register circuit, such as is disclosed partly in Figs. 1 and 2, the off-normal relay ON(1) thereof is operated by the marker. The reference to "relay ON(1)" means the relay whose reference designation on the drawing is "ON," which relay appears in Fig. 1. This reference system will be used throughout the specification, it being understood that the number enclosed in the parentheses merely designates the figure of the drawing upon which the referenced part is located.

Relay ON(1), upon operating, partly prepares the originating register circuit for operation as follows:

(1) Positive battery is applied over contact 2 of relay ON(1) to the main anode of gas tube P2A(1);

(2) Positive battery is applied over contact 2 of relay ON(1) and over contact 3 of relay AD(1) to the main anodes of gas tubes 11A(1) and 11B(1);

(3) Positive battery is applied over contact 3 of relay ON(1) to the main anode of gas tube P6(1) through resistance 100;

(4) Ground is applied over contact 4 of relay ON(1), contact 5 of relay AD(1), conductor 101, to negative battery through the winding of relay AS(2), thereupon operating relay AS(2);

(5) Ground is applied over contact 6 of relay ON(1), conductor 102, contact 8 of relay BS(2), contact 8 of relay AS(2), to battery through the winding of relay AS(2) to lock relay AS(2) operated; and (6) Ground is applied over contact 5 of relay ON(1), to the armatures associated with contacts 8 and 9 of relay RA1(1), extending, when relay RA1(1) is operated, over conductors 103 and 104 to armatures of the odd and even steering relays OD(2) and EV(2) for a purpose to be described hereinafter.

*Interconnection between calling subscriber and originating register*

After the seizure by a marker of an idle originating register circuit, as above outlined, the marker effects an interconnection, over the crossbar switch trains, between the seized register and the calling line, thereby closing the ring and tip conductors 105 and 106 of the register over the calling line loop. Relay L(1) is operated in a circuit extending from ground, through the lower left secondary winding of the dial tone transformer 107, conductor 106, over the switch train and the line loop, back over conductor 105, to battery through the winding of relay L(1). Relay L(1), upon operating, operates relays L1(1) and SR(1) in a series circuit extending from ground, over contact 2 of relay L(1), through the winding of relay SR(1), to battery through the winding of relay L1(1). It is advisable to arrange that relay SR(1) be a little slower to operate than relay L1(1) for a reason to be explained hereinafter. Relay L1(1), upon operating, discharges any charge which may have accumulated on condenser 108 in an obvious circuit through resistance 109 and over contact 1 of relay L1(1). Relay SR(1), upon operating, applies positive battery, over contact 1 of relay ON(1), contact of relay SR(1) to the following circuit locations:

(1) To the main anode of tube P1A(1);

(2) To the main anode of gas tube P(1) through resistance 109 and over contact 1 of relay L1(1);

(3) To the main anode of gas tube P(1) through condenser 108;

(4) To the main anodes of the counting tubes P1(1), P2(1), P3(1), P4(1) and P5(1) through a resistor 110 common thereto; and (5) To the main anode of tube RA(1) through resistance 111.

It is desirable that relay SR(1) operate slower than relay L1(1) to prevent this positive battery being applied through resistance 109, over contact 2 of relay L1(1) to the control anode of tube P(1). This prevents tube P(1) from being fired prior to open line loop pulses being received by the register, thereby preventing the detection and counting of what otherwise would be considered a legitimate digit pulse.

Dial tone is transmitted from the source 148 thereof through transformer 107 to the calling subscriber who may then begin to dial the called number.

*Counting initial digit of one*

An initial digit of one pulse, unless followed directly by a second digit of one pulse as will be explained, is assumed not to be a legitimate signal because of the frequency with which such erroneous indications may be effected by accidental manipulation of the subscriber's dial, by spurious electrical impulses, etc. Such an initial digit is absorbed on the basis of the above assumption; but, as will be explained, it is not discarded in view of the fact that a second digit of one pulse is presumed to be a legitimate 11 prefix for a special code, such as a service code of 11X where X may be any digit from 2 to 9.

Upon the release of relay L(1), responsive to the first open line loop period of the first pulse, relay L1(1) also releases but relay SR(1), due to its slow releasing characteristic, remains operated during the release time of relay L(1) during open loop pulse periods. Relay L1(1), upon releasing, applies positive battery over contact 1 of relay ON(1), contact of relay SR(1), resistance 109, contact 2 of relay L1(1) to the starter anode of tube P(1) through resistance 112. The same positive battery is applied to the main anode of tube P(1) through condenser 108. The cathode of tube P(1) is connected to negative battery through resistance 113.

Under these voltage conditions tube P(1) will be ionized across the starter anode-cathode gap and the ionization will transfer to a main discharge across the main gap in a circuit from negative battery, through cathode resistance 113, across the discharge path of tube P(1), through condenser 108 to positive battery. At this instant the entire voltage will be effective across the tube P(1) and resistance 113 in series therewith due to the low impedance of condenser 108 under this transient condition. For instance, if it be assumed that positive battery supplies +130 volts and negative battery supplies −48 volts, it will be appreciated that about 178 volts is impressed across the tube P(1) and resistance 113. If it be assumed that about 70 volts is required to sustain the discharge across the main gap, there will appear about 108 volts across resistance 113. Condenser 108 begins to acquire a charge in the circuit and, as it does so, in view of the fact that about 70 volts are always required to sustain the discharge, whatever voltage is acquired by condenser 108 must be taken from the voltage across resistance 113. It will be appreciated that condenser 108 will acquire voltage in this manner until all of the voltage across resistance 113 is eliminated, at which time, for purposes of illustration, it may be assumed that condenser 108 has acquired a charge of 107 volts leaving the remaining 70 volts barely sustaining the discharge and leaving 1 volt across resistance 113. Condenser 108 will continue to charge thereby tending to reduce the voltage available for sustaining the discharge and, when the latter is reduced below, say about 70 volts, the tube is extinguished. If it be assumed that the condenser 108 and resistance 113 are of such values that condenser 108 acquires sufficient voltage in about .002 second to extinguish tube P(1), the effect is a pulse across resistance 113 of about 108 volts maximum magnitude lasting for about .002 second. The above voltage and time constant assumptions are illustrative only and are in no way intended to limit the scope of this invention.

This positive pulse (relative to negative battery) is applied to the pulsing conductor 114. Each of the main anodes of the counting tubes P1(1) to P5(1) is supplied with positive battery from conductor 115 through a common anode resistance 110 as above described. Each of the cathodes of tubes P1(1) to P5(1) is held at negative battery through respective cathode resistances 121, 122, 123, 124 and 125; and, the cathode of tube P6(1) is held at negative battery through the winding of relay P66(1). The main anode of tube P6(1) is supplied by positive battery, over contact 3 of relay ON(1) and through resistance 100.

The starter anodes of tubes P1(1) to P6(1) are all connected to the pulse conductor 114 through resistances 131 to 136 respectively and condensers 141 to 146 respectively. A unidirectional device, such as a dry rectifier, an asymmetrical resistance, which has relatively low impedance to passage of current of one polarity in one direction and a relatively high impedance to the opposite polarity in the same direction, is connected from the junction of the resistance, such as resistance 134 for tube P4(1), and the condenser, such as condenser 144 for tube P4(1), to the cathode of the immediately preceding tube, such as tube P3(1). These varistors are identified for each tube P1(1) to P6(1) as varistors 151 to 156 respectively. It will be noticed that varistor 151 for tube P1(1) is not connected to the control anode condenser 141 thereof unless relay RAA(1) is operated to close its contact 2.

The varistors are poled such that they represent low impedance in the direction of the arrows when the arrow sides thereof are slightly positive relative to the other sides. Thus, when a cathode, say of tube P3(1), is at negative battery (say −48 volts for example), varistor 154 will effect considerable attenuation of any pulse on its arrow side of a voltage of slightly less negative voltage than negative battery. That is, if a pulse of say −38 volts is impressed upon the arrow of varistor 154, there will be a 10 volt potential across varistor 154 so poled as to cause varistor 154 to appear as a low impedance thereto such that any pulses on conductor 114 of a more positive amplitude than about −38 volts will in effect be absorbed or shunted off through varistor 154. This will mean, assuming the cathode of tube P3(1) to be at negative battery (say −48 volts), that only about 10 volts or so of any pulse on conductor 114 can be effective at the control or starter anode of tube P4(1). This small rise of starter anode potential of tube P4(1) with respect to its cathode potential is not sufficient to fire tube P4(1).

Since all cathodes are at negative battery potential, no tube can be fired by a pulse on conductor 114 from the cathode resistance 113 of the pulse tube P(1), except tube P1(1), the varistor circuit for which, it will be recalled, is open at contact 2 of relay RAA(1). Since the varistor 151 is not connected to the control anode circuit of tube P1(1), the entire pulse on conductor 114 (which as explained above may be about 100 volts positive with respect to negative battery under the voltage conditions assumed by way of example) is effective across the starter gap of tube P1(1). This pulse is sufficient to fire tube P1(1), which discharges in a circuit from negative battery, through condenser 116, across the main gap of tube P1(1), to positive battery through resistance 110. The presence of condenser 116, during this initial transient, effects a low impedance shunt across resistance 121 thus keeping the cathode of tube P1(1) at effectively negative battery for an interval of time depending upon the time constant of the circuit of resistance 121 and condenser 116. This time constant is made sufficiently long such that the potential of the cathode of tube P1(1) cannot rise sufficiently, during the short duration of the positive pulse on conductor 114, to increase the voltage effective at the control anode of tube P2(1), thereby preventing tube P2(1) from also firing.

After the transient period, condenser 116 becomes charged such that the cathode of tube P1(1) is appreciably positive with respect to negative battery (say about 80 volts positive with respect to negative battery). It will be apparent now that varistor 152, whose cathode side is at say 80 volts positive with respect to negative battery, will represent a high impedance to a pulse on its arrow side until that pulse becomes about 90 or 100 volts positive with respect to negative battery (which is substantially the value of the pulses produced on the pulse conductor 114). This means that tube P2(1) has been conditioned by the firing of tube P1(1), such that tube P2(1) can fire on the next pulse, if any, of the digit. The conditioning has taken place through the agency of the gate action of varistor 152 under the changed potential condition of the cathode of tube P1(1).

The pulse on conductor 114 is also applied to the control anode of tube P1A(1) through resistance 117 and condenser 118. Since the cathode of tube P1A(1) is connected to negative battery through the winding of relay RAA(1), through resistance 119, and over contact 5 of relay RA1(1), tube P1A(1) will be fired and a discharge will take place from the cathode circuit, just traced, across the main anode gap, to positive battery previously traced, thereby operating relay RAA(1), which relay locks to positive battery over its contact 4. This positive battery over contact 4 of relay RAA(1) extinguishes tube P1A(1) by short-circuiting its main gap.

Relay RAA(1), upon operating, closes, at its contact 2, the aforementioned circuit including the varistor 151 of the control anode circuit of tube P1(1). This will prevent tube P1(1) from firing on any succeeding pulse of any one digit.

It will be noticed that up to this point in the circuit operation, either or both of relays L(1) and RAA(1) have been released. With either or both of relays L(1) and RAA(1) released, ground from contact 1 of relay L(1) or from contact 3 of relay RAA(1), or from both, is applied to discharge the condenser 120 in the control anode circuit of tube RA(1). This discharge path is obvious and includes resistance 126.

*Interdigital timing*

When relay L(1) reoperates at the end of the first pulse, relay L1(1) reoperates. Relay L1(1), upon reoperating, completes a previously described circuit over its contact 1 for discharging the main anode condenser 108 of tube P(1), thereby preparing tube P(1) for producing another pulse upon the next release of relay L1(1).

Relay L(1), upon reoperating with relay RAA(1) also operated, removes the discharging ground from the starter anode condenser 120 of tube RA(1). Condenser 120 begins to acquire a positive charge in a circuit extending from positive battery, over contact 1 of relay ON(1), contact of relay SR(1), resistance 127, resistance 126, condenser 120, to ground. The time constant of this charging circuit is such that if the reoperation of relay L(1) lasts for a short interval of time representing merely a pause between pulses of a digit, then condenser 120 will not acquire sufficient charge, by the time relay L(1) again releases to discharge condenser 120, to fire tube RA(1); but, if the reoperation of relay L(1) lasts for a relatively long interval of time representing an interdigital pause, then condenser 120 will acquire sufficient charge, before relay L(1) again releases, to fire tube RA(1).

As has been assumed, the first pulse is considered to represent a one-pulse digit. Relay L(1) will remain operated long enough to permit the condenser 120 to acquire a charge sufficient to fire tube RA(1). When tube RA(1) fires, the main discharge occurs in a circuit extending from negative battery, through the winding of relay RA1(1), cathode of tube RA(1), across the main gap of tube RA(1), through resistance 111, to positive battery. Relay RA1(1) operates in this circuit, thereby releasing relay RAA(1).

Relay RAA(1), upon releasing, opens the circuit of varistor 151 and discharges condenser 120.

Relay RA1(1), upon operating, connects the cathodes of tubes P1(1), P2(1), P3(1), P4(1) and P5(1), through respective resistances 161 to 165, contacts 2, 3, 4, 6 and 7 of relay RA1(1), to negative battery through the windings of respective relays P11(1), P22(1), P33(1), P44(1) and P55(1). Since all tubes except tube P1(1) are not conducting, all of their cathodes are at negative battery and relays P22(1) through P55(1) will not operate. Since tube P1(1) is conducting, the cathode thereof will be at a relatively high positive potential with respect to negative battery, whereupon relay P11(1) operates, and locks over its contact 2, through the winding of relay PL(1), contact 1 of relay RAA(1), to positive battery. Relay PL(1) operates in that circuit.

Relay PL(1), upon operating, extinguishes tube P1(1), by applying ground to the main anode thereof over contact 1 of relay RA1(1) and contact 2 of relay PL(1). Relay PL(1), upon operating, extinguishes tube RA(1) by applying ground, over contact 1 of tube PL(1) to the main anode of tube RA(1). Relay RA1(1) releases when tube RA(1) is extinguished.

*Absorbing initial digit of one*

Relay P11(1), upon operating, and before relay RA1(1) is released as above described, completes circuits for grounding two of the five conductors 170, 171, 172, 174 and 177 to indicate, on a two-out-of-five code basis, the pulse value of the digit which has been detected and counted. The grounding of two of these five conductors will, under favorable circumstances, operate two of each group of five register relays of Fig. 2, such as relays A0(2), A1(2), A2(2), A4(2) and A7(2) for the first or "A" digit. This two-out-of-five code is set up as follows:

| Digit | Conductors Grounded | Digit | Conductors Grounded |
|---|---|---|---|
| 1 | 170, 171 | 6 | 172, 174 |
| 2 | 170, 172 | 7 | 170, 177 |
| 3 | 171, 172 | 8 | 171, 177 |
| 4 | 170, 174 | 9 | 172, 177 |
| 5 | 171, 174 | 0 | 174, 177 |

Prior to the above release of relay RA1(1), two circuits are completed from ground, over contacts 10 and 11 of relay RA1(1), contacts 7 and 5 of relay P77(1), contacts 3 and 4 of relay P11(1), conductors 170 and 171, to the armatures of relays OD(2) and EV(2) which are associated with respective pairs 0 and 1 of contacts of each relay. Since neither of these relays OD(2) and EV(2) is operated at this time the digit one will not be registered in the register relays of Fig. 2. As will be appreciated from subsequent description, neither relay OD(2) nor relay EV(2) will be operated until relay AD(1) operates which will not happen until a digit of at least two pulses is counted by the circuit of Fig. 1.

Upon the operation of relay P11(1), positive battery is supplied over contact 3 of relay ON(1), contact 2 of relay P77(1), contact 1 of relay P11(1), contact 4 of relay AD(1), to resistance 128 and condenser 129. This positive pulse on the starter anode of tube 11A(1) fires tube 11A(1) which discharges in a circuit from ground, through the cathode resistance 130, across the main gap, over contact 3 of relay AD(1), to positive battery over contact 2 of relay ON(1). The positive pulse appearing at the junction of condenser 129 and resistance 137 does not fire tube 11B(1) because of the following described conditions. Varistor 147 is connected from the junction of resistances 137 and 138 to the ungrounded side of condenser 140 and to the cathode of tube 11A(1) through resistance 139. It will be observed that since condenser 140 is a low impedance to this transient pulse and since the positive pulse is applied to varistor 147 in its low impedance direction, resistance 137 will embody most of the voltage of the pulse, the effect of varistor 147 being, as has been described in connection with the counting tubes P1(1) to P6(1), to shunt off or absorb or attenuate the positive pulse so greatly that it cannot fire tube 11B(1).

Condenser 129 will quickly acquire a charge substantially equal to the positive battery voltage which will produce substantially positive battery potential on the top plate of condenser 129 and substantially no voltage (with respect to ground) at the junction of resistances 137 and 138. This condition will remain until positive battery is removed from condenser 129.

As soon as tube 11A(1) fires, condenser 140 will begin to acquire a charge and very shortly will be charged to the potential of the cathode of tube 11A(1), which will be positive battery less the tube drop. If it be assumed that positive battery is +130 volts and that the sustaining voltage of tube 11A(1) is about 70 volts, then condenser 140 will be charged to a voltage of about +60 volts on its top plate at varistor 147.

Upon the first pulse of the next digit relay RAA(1) will be reoperated, as above, thereby releasing relays PL(1) and P11(1). The release of relay P11(1) at that time will remove, at its contact 1, positive battery from condenser 129. Tube 11A(1) will remain fired with condenser 140 charged positively, as above described. When battery is removed from condenser 129, however, condenser 129 discharges quickly through the circuit including resistances 138, 137 and 148 thereby creating a high negative pulse at the junction of resistances 137 and 138. Due to the cathode of tube 11B(1) being at negative battery the negative pulse will not fire the starter gap of tube 11B(1). The values of resistances 137 and 138 are arranged such that the negative pulse from resistance 138 will not fire the starter main anode gap of tube 11B(1). Condenser 129 thus discharges without affecting the condition of tubes 11A(1) and 11B(1).

*A second digit of one pulse*

If a second digit of one pulse is received and counted by the originating register circuit, it is assumed that this is a legitimate indication of a 11 prefix to a special 11X code which may be of a service nature.

When relays L(1) and L1(1) release in response to the first open line loop period of the second digit, tube P(1) is again fired to create a positive pulse on conductor 114 followed by the extinguishing of tube P(1) due to the charging of condenser 108, as above described. This pulse, as before, fires tubes P1(1) and P1A(1). Tube P1(1), upon firing, conditions varistor 152 such that the next pulse, if any, of the same digit will fire tube P2(1). Tube P1A(1), upon firing, operates relay RAA(1), as before, thereby releasing relays PL(1) and P11(1) and extinguishing tube P1A(1).

When relays L(1) and L1(1) reoperate at the end of the first pulse the starter anode condenser 120 of tube RA(1) begins to charge up to time the interdigital pause, as before. Under the assumption that this second digit is one pulse, tube RA(1) will fire operating relay RA1(1), thereby releasing relay RAA(1), as before.

Relay RA1(1), upon operating, operates relay P11(1) as before. Relay P11(1) locks in series with relay PL(1). Relay PL(1), upon operating as previously described, extinguishes tubes P1(1) and RA(1). When tube RA(1) is extinguished, relay RA1(1) releases.

Relay P11(1), upon operating, again applies the previously traced positive battery to condenser 129 of tube 11B(1). This time, however, due to the fact that tube 11A(1) is conducting, the left side of varistor 147 is at a relatively high positive voltage due to the charge acquired by condenser 140 since the first digit single pulse. Thus varistor 147 represents a high impedance to the present positive pulse until the pulse value exceeds the charge on condenser 140. This positive pulse, therefore, in conjunction with the negative bias of the cathode of tube 11B(1), fires tube 11B(1) thereby operating relay 11(1). Relay 11(1) locks to positive battery over contact 3 of relay ON(1) and extinguishes tube 11B(1) by applying positive battery to its cathode.

The operation of relay 11(1) may be used to transmit the added information to a subsequently seized marker that an initial 11 prefix was registered.

It will be apparent that if a third digit of one pulse is received, there will be no effect whatsoever except the operation of relays PL(1) and P11(1), which will not affect the registers of Fig. 2 and which will not refire tube 11B(1) because of the positive bias on the cathode of tube 11B(1).

*Receipt of a digit of value of at least two pulses*

Let it be assumed that the next digit is of two or more pulses, say 4.

Upon the first release of relays L(1) and L1(1), tube P(1) is fired to produce a short positive pulse on conductor 114 whereupon tube P(1) extinguishes itself due to the charging up of its main anode condenser 108. The first pulse on conductor 114 fires tubes P1(1) and P1A(1) as before. Tube P1(1), upon firing, conditions varistor 152 such that the next pulse will fire tube P2(1). Tube P1A(1), upon firing, operates relay RAA(1) which locks as before and extinguishes tube P1A(1). Relay RAA(1), upon operating, closes its contact 2 thereby to connect varistor 151 to the starter anode circuit of tube P1(1) such that when tube P1(1) is extinguished, as explained below upon the firing of tube P2(1), then tube P1(1) cannot be fired again until after tube P5(1) is fired to condition varistor 151 such as to permit tube P1(1) to be fired with tube P6(1) on the sixth pulse, if that many are received. Relay RAA(1), upon operating, releases relays PL(1) and P11(1).

When relays L(1) and L1(1) reoperate at the end of the first pulse, the main anode condenser 108 of tube P(1) is discharged and the starter anode condenser 120 of tube RA(1) begins to acquire a charge. Since it is assumed that this digit comprises four pulses, it will be appreciated that condenser 120 will not have sufficient time to acquire a charge adequate to fire tube RA(1) until the reoperation of relay L(1) at the end of the fourth pulse when relay L(1) remains operated for a relatively long time during the interdigital pause.

Upon the second release of relays L(1) and L1(1) during the second open line period of the second pulse, tube P(1) is again fired producing a positive pulse on conductor 114 and extinguishing itself. The pulse on conductor 114 will fire tube P2(1) because varsitor 152 represents a high impedance due to the conduction through tube P1(1) as previously explained. Tube P1A(1) will not fire this time due to the high positive potential on its cathode from contact 4 of relay RAA(1). When tube P2(1) fires, the conduction current causes an additional (conduction current through tube P1(1) also) voltage drop across resistance 110 which is common to the main anodes of tubes P1(1) to P5(1). The dropping of main anode voltage at tube P1(1) extinguishes tube P1(1) because the cathode thereof at this time, as has been explained, is at a voltage sufficiently positive with respect to negative battery that there no longer is sufficient voltage across the main gap to sustain the discharge. The same drop in main anode voltage occurs of course at tube P2(1); however, at this time, due to the presence of condenser 149 in the cathode circuit of tube P2(1), its cathode is held momentarily at substantially negative battery thereby retaining sufficient sustaining main gap voltage even in view of the additional drop in main anode voltage.

For instance, let it be assumed that negative battery is −48 volts, that positive battery is +130 volts, that the voltage drop across resistance 110 for any one tube current is 25 volts, that the voltage drop across the cathode resistance, such as resistance 121 for tube P1(1), of a conducting tube is 80 volts, and that the sustaining main gap voltage per tube is 70 volts. When tube P1(1) is conducting the main anode is at +105 volts, and its cathode is at +32 volts, providing a sustaining main gap voltage of 73 volts which will maintain tube P1(1) in the conducting condition. When tube P2(1) fires, its cathode is momentarily maintained at −48 volts due to the presence of condenser 149. The 25-volt drop in resistance 110 due to the firing of tube P2(1) will reduce the main anode voltage on both tubes P1(1) and P2(1) to +80 volts. Since the cathode of tube P1(1) is at +32 volts there is only 48 volts available for main gap sustaining voltage and tube P1(1) extinguishes. However, since the cathode of tube P2(1) is momentarily at −48 volts there will be 120 volts available across the main gap of tube P2(1), which is sufficient to cause and sustain main gap discharge.

Thus tube P2(1) fires and tube P1(1) extinguishes. As soon as the cathode of tube P2(1) rises in potential due to the discharge through tube P2(1) this rise in potential is applied over contact 1 of relay AD(1) to the starter anode of tube P2A(1), firing tube P2A(1) whose cathode is at negative battery through the winding of relay AD(1), across the main gap of tube P2A(1), to positive battery over contact 2 of relay ON(1). Relay AD(1) operates and locks to that same positive battery over its contact 2 and by the same means applies positive battery to the cathode of tube P2A(1) extinguishing tube P2A(1).

Relay AD(1), upon operating, opens, at its contact 3, the main anode circuits of tubes 11A(1) and 11B(1) thereby extinguishing tube 11A(1) and preventing the firing of either as long as relay AD(1) is operated.

Relay AD(1), upon operating, applies ground over its contact 6, conductor 150, contact 10 of relay AS(2), contact 8 of relay OD(2), to battery through the winding of relay EV(2) thereby operating relay EV(2). The operation of relay EV(2) connects conductors 170, 171, 172, 174 and 177, over contacts 0, 1, 2, 4, and 7 of relay EV(2), contacts 0, 1, 2, 4 and 7 of the A digit steering relay AS(2), to the windings of the A digit register relays A0(2), A1(2), A2(2), A4(2), and A7(2) preparatory to registering therein, on a two-out-of-five basis as previously explained, the pulse value of the first digit (exclusive of a 11 prefix) containing two or more pulses. Thus it is apparent that no digit can be registered until relay AD(1) is operated which does not take place until tube P2A(1) is fired by the second pulse of the first digit containing two or more pulses.

When relays L(1) and L1(1) reoperate at the end of the second pulse, condenser 108 in the main anode circuit of tube P(1) is again discharged and condenser 120 in the starter anode circuit of tube RA(1) is again started to acquire a charge to measure the interdigital timing.

Relays L(1) and L1(1) will release during the third open loop period of the third pulse thereby firing tube P(1) and discharging condenser 120. The firing of tube P(1) will extinguish itself and will fire tube P3(1) which in turn extinguishes tube P2(1).

When relays L(1) and L1(1) reoperate at the end of the third pulse, condenser 108 is discharged and condenser 120 begins to measure the interdigital time.

When relays L(1) and L1(1) release during the fourth pulse, tube P(1) fires and extinguishes itself. The firing of tube P(1) fires tube P4(1) which in turn extinguishes tube P3(1).

Upon the operation of relays L(1) and L1(1), at the end of the fourth pulse, condenser 108 discharges and condenser 120 begins to acquire a charge to measure the interdigital timing.

Under the assumed conditions this point will be the end of the digit whereupon, as previously explained, condenser 120 will acquire a charge sufficient to fire tube RA(1). When tube RA(1) discharges, relay RA1(1) operates, releasing relay RAA(1), which latter discharges condenser 120.

Relay RA1(1), upon operating, operates relay P44(1) in a circuit extending from positive voltage at the cathode of tube P4(1), through resistance 164, contact 6 of relay RA1(1), to negative battery through the winding of relay P44(1). Relay P44(1) operates and locks over its contact 1, through the winding of relay PL(1), to positive battery over contact 1 of relay RAA(1). Relay PL(1) operates in this locking circuit for relay P44(1). The operation of relay PL(1) extinguishes tubes P4(1) and RA(1) thereby releasing relay RA1(1). During the time interval between the operation of relays RA1(1) and P44(1) and the release of relay RA1(1), the following functions are performed:

(1) Steering relay BS(2) is operated and locked to off-normal ground;

(2) Steering relay AS(2) is held operated; and, (3) The digit four is registered in register relays A0(2) and A4(2) which are locked to off-normal ground.

Re (1) above, as soon as relay RA1(1) operates, ground is applied over contact 5 of relay ON(1), contact 9 of relay RA1(1), conductor 104, contact 9 of relay EV(2), contact 11 of relay AS(2), to battery through the winding of relay BS(2). Relay BS(2) operates and locks over its contact 9, and over a back contact of the next steering relay CS (not shown), over conductor 102, to off-normal ground over contact 6 of relay ON(1). Since the B register relays B0(2) to B7(2) are operated over contacts of relay OD(2) and since relay OD(2) is not operated, the operation of relay BS(2) has no function at this time.

Re (2) above, when relay BS(2) operates, it opens, at its contact 8, the locking circuit for relay AS(2). In order to hold relay AS(2) operated ground is applied over contact 5 of relay ON(1), contact 8 of relay RA1(1), conductor 103, contact 10 of relay EV(2), contact 9 of relay AS(2), to battery through the winding of relay AS(2).

Re (3) above, ground is applied over contacts 10 and 11 of relay RA1(1), contacts 7 and 5 of relay P77(1), contacts 2 and 3 of relay P44(1), conductors 170 and 174, contacts 0 and 4 of relay EV(2), contacts 0 and 4 of relay AS(2), to batteries through respective windings of relays A0(2) and A4(2). Relays A0(2) and A4(2) operate and lock over their contacts 2 to off-normal ground on conductor 102.

As above, upon the operation of relay PL(1), tubes P4(1) and RA(1) are extinguished; and, relay RA1(1) releases when tube RA(1) is extinguished. Relays P44(1) and PL(1) remain operated:

(1) Until relay RAA(1) is reoperated on the first pulse of the next succeeding digit; or, (2) Until relay SR(1) releases due to disconnection by the calling subscriber; or, (3) Until off-normal relay ON(1) should release for any reason.

Upon the release of relay RA1(1), ground is removed from conductors 170 and 174 and relay AS(2) is released. Upon the release of relay AS(2), relay EV(2) releases. Upon the release of relay EV(2), relay OD(2) operates in a circuit extending from ground, over contact 12 of relay BS(2), contact 8 of relay EV(2), to battery through the winding of relay OD(2), thereby extending conductors 170 to 177 to contacts of relay BS(2) preparatory to registering the B digit.

*Receipt of B digit*

It is assumed that the next digit is greater than or above 5, such as the digit 8. The counting tubes progress as above described for the first five pulses such that at the end of the fifth pulse the following conditions appear:

(1) Tube P5(1) is conducting and all other tubes P1(1) to P4(1) and P6(1) are extinguished;

(2) Relay RAA(1) is operated and locked; and, (3) Relays L(1) and L1(1) have reoperated thereby discharging condenser 108 and permitting condenser 120 to begin to acquire a charge to time the interdigital period.

It will be apparent that until tube P5(1) was fired varistors 156 and 151 were conditioned to prevent the firing of either tube P6(1) or tube P1(1). However, when tube P5(1) conducts its cathode is made positive with respect to negative battery thereby to condition both varistors 151 and 156 such that the sixth pulse, if any, will fire both tubes P1(1) and P6(1).

When relays L(1) and L1(1) release during the sixth pulse, condenser 120 is discharged and tube P(1) is fired. Tube P(1), upon firing, extinguishes itself and applies a positive pulse to conductor 114. The pulse on conductor 114 fires tubes P1(1) and P6(1), the latter operating relay P66(1) in a circuit extending from negative battery, through the winding of relay P66(1), across the main gap of tube P6(1), through resistance 100, to positive battery over contact 3 of relay ON(1). Since tube P1(1) has a different main anode circuit from tube P6(1), the discharge through tube P6(1) will not extinguish tube P1(1), as was the case with tubes P1(1) to P5(1) having the common main anode resistance 110; but, the firing of tube P1(1) extinguishes tube P5(1). Relay P66(1), upon operating, locks in series with relay P77(1) in a circuit extending from negative battery, through the winding of relay P66(1), contact of relay P66(1), winding of relay P77(1), to positive battery over contact 3 of relay ON(1). Relay P77(1) operates in this locking circuit. Relay P77(1), upon operating, extinguishes tube P6(1), by grounding the main anode thereof over contact 1 of relay P77(1).

When relays L(1) and L1(1) reoperate at the end of the sixth pulse, condenser 108 is discharged and condenser 120 begins to time the interdigital period.

During the seventh pulse tube P2(1) is fired and tube P1(1) is extinguished. During the release of relays L(1) and L1(1) responsive to the eighth line loop pulse, tube P3(1) is fired, thereby extinguishing tube P2 (1). When relays L(1) and L1(1) reoperate at the end of the eighth pulse (end of the B digit), condenser 108 is discharged and condenser 120 begins to time the interdigital pause.

Since it has been assumed that the B digit is of eight pulses, condenser 120 will acquire a charge sufficient to fire tube RA(1). Tube RA(1), upon firing, operates relay RA1(1), which releases relay RAA(1) to discharge condenser 120. Relay RA1(1), upon operating, operates relay P33(1) in a circuit extending from positive voltage on the cathode of tube P3(1), through resistance 163, contact 4 of relay RA1(1), to negative battery through the winding of relay P33(1). Relay P33(1) operates and locks over its contact 1, through the winding of relay PL(1), contact 1 of relay RAA(1) to positive battery. Relay PL(1) operates in this locking circuit. Relay P33(1), upon operating, extends negative battery over its contact 6 and over contact 3 of relay P77(1) to lock relay P77(1) operated and to shunt release relay P66(1).

Upon the operation of relay RA1(1), ground is applied over conductors 103 and 104 from contacts 8 and 9 of relay RA1(1). Ground on conductor 104 is extended over contact 9 of relay OD(2) and contact 11 of relay BS(2) to operate the next steering relay CS (not shown), which relay CS will lock to off-normal ground over a back contact of the next succeeding steering relay DS (not shown). Ground on conductor 103 is extended over contact 10 of relay OD(2) and contact 10 of relay BS(2) to hold relay BS(2) operated when the other holding circuit for relay BS(2) is opened by the operation of relay CS (not shown).

Upon the operation of relay P33(1), ground is extended over contacts 10 and 11 of relay RA1 (1), contacts 6 and 4 of relay P77(1), contacts 4 and 5 of relay P33(1), to conductors 171 and 177. This represents the digit 8. If relay P77(1) were not operated these grounds would be extended over contacts 7 and 5 of relay P77(1), contacts 2 and 3 of relay P33(1), to conductors 171 and 172. This would represent the digit 3. The operation of relay P77(1) on the sixth pulse in effect permits the reuse of tubes P1(1) to P5(1) and relays P11(1) to P55(1) for the digits 6, 7, 8, 9 and 0. That is, if relay P77(1) is unoperated, the digit value is 5 or less; and, if relay P77(1) is operated, the digit value is above 5.

Ground on conductors 171 and 177 are extended over contacts 1 and 7 of relay OD(2), contacts 1 and 7 of relay BS(2), to batteries through respective windings of relays B1(2) and B7(2). Relays B1(2) and B7(2) operate and lock over their contacts 2 to off-normal ground on conductor 102.

Upon the operation of relay PL(1), tubes P3(1) and RA(1) are extinguished, thereby releasing relay RA1(1). Relays P33(1), PL(1) and P77(1) remain operated:

(1) Until relay RAA(1) reoperates; or,
(2) Until relay SR(1) releases; or,
(3) Until relay ON(1) releases.

Upon the release of relay RA1(1), relay BS(2) releases. The release of relay BS(2) releases relay OD(2). When relay OD(2) releases, relay EV(2) will be operated over contact 8 of relay OD(2) from ground on relay CS (not shown) in a manner similar to the previous operation of relay OD(2) by relay BS(2) over contact 12 of the latter.

*Subsequent digits*

The receipt, detection, counting, steering, and registering of subsequent digits are accomplished similarly to the above discussion and further detailed analysis of the circuit operation is considered unnecessary.

*Seizing an idle marker*

When the originating register has registered in its relays of Fig. 2 sufficient digits to warrant seizure of an idle marker circuit for completion of the call, such a marker is seized under the control, as disclosed by Busch and Dehn above, of the steering relays of Fig. 2. For instance, relay HS(2) will operate after the seventh or G digit (exclusive of a 11 prefix) has been registered. The HS(2) relay may be arranged to complete the marker start circuit after receipt and registration of seven digits which may comprise a complete called number of three office code digits and four numericals.

If an initial 11 prefix is detected and registered by the operation of relay 11(1), relay BS(2) may complete the marker start circuit for seizing an idle marker after the X digit of the 11X code is registered in the A register of Fig. 2. In this case the operated relay 11(1) may be arranged to transmit a special signal to the seized marker.

*Completion of connection*

When an idle marker is seized, the information registered in the digit registers of Fig. 2, along with other information, is transferred to the marker on a two-out-of-five basis by ground on two out of the five conductors from the contacts 1 of each group of relays.

The marker releases the originating register, thereby returning all apparatus of Figs. 1 and 2 to normal, completes the indicated connection, and releases leaving the connection under the supervision of a trunk for instance.

It is to be understood that the above-described arrangement is illustrative of the application of the principles of the invention. Numerous other arrangements may be devised by those skilled in the art without departing from the spirit and scope of the invention.

What is claimed is:

1. In a signaling system, means for generating impulses, at least two gas-filled tubes for counting said impulses, each tube comprising a cathode and a main anode and a starter electrode, means for applying said impulses simultaneously to the starter electrode circuits of both tubes, an asymmetric impedance element individual to each tube and in shunt with the starter electrode circuit of said tube, means individual to each non-conducting tube for causing the element connected to the starter electrode circuit of the other tube to offer a low shunt impedance to said impulses, means effective upon conduction by each tube to increase the shunt impedance to said impulses of the element connected to the starter electrode circuit of the other tube, and means to cause the conduction by only one of said tubes in response to the first impulse.

2. In a signaling system, means for generating impulses, a chain of gas-filled tubes for counting said impulses, each tube comprising a cathode and a main anode and a starter electrode, means for applying said impulses simultaneously to the starter electrode circuits of all of said tubes, an asymmetric impedance element individual to each tube and in shunt with the starter electrode circuit of said tube, means individual to each non-conducting tube for causing the element connected to the starter electrode circuit of the next succeeding tube to offer low shunt impedance to said impulses, means effective upon conduction by each tube to increase the shunt impedance to said impulses of the element connected to the starter electrode circuit of the next succeeding tube, and means to cause the conduction by only the first of said tubes in response to the first impulse.

3. In a signaling system, means for generating impulses, a chain of gas-filled tubes for counting said impulses, each tube comprising a cathode and a main anode and a starter electrode, means for applying said impulses simultaneously to the starter electrode circuits of all of said tubes, an asymmetric impedance element connected between the cathode circuit of each tube and the starter electrode circuit of the next succeeding tube, said elements being so poled as to offer low shunt impedance to said impulses when said elements are connected to cathode circuits of tubes which are not conducting, means effective upon conduction by each tube to increase the shunt impedance to said impulses of the element connected to the cathode circuit of said conducting tube, and means to cause the conduction of only the first of said tubes in response to the first impulse.

4. In a signaling system, means for generating impulses, a chain of gas-filled tubes for counting said impulses, each tube comprising a cathode and a main anode and a starter electrode, means for applying said impulses simultaneously to the starter electrode circuits of all of said tubes, an asymmetric resistance connected between the cathode circuit of each tube and the starter electrode circuit of the next succeeding tube, said resistances being so poled as to offer low shunt impedance to said impulses when said resistances are connected to cathode circuits of tubes which are not conducting, means effective upon conduction by each tube to increase the shunt impedance to said impulses of the resistance connected to the cathode circuit of said conducting tube, and means to cause the conduction of only the first of said tubes in response to the first impulse.

5. In a signaling system, means for generating positive impulses, a chain af gas-filled tubes for counting said impulses, each tube comprising a cathode and a main anode and a starter electrode, means for applying said impulses simultaneously to the starter electrode circuits of all of said tubes, each tube having its cathode connected to negative potential through a cathode load individual to said tube, an asymmetric resistance connected between the cathode of each tube and the starter electrode circuit of the next succeeding tube, said resistances being so poled as to offer a low impedance shunt to said impulses when said resistances are connected to cathodes of non-conducting tubes, means including said cathode loads and effective upon conduction by each tube to increase the shunt impedance to said impulses of the resistance connected to the cathode of said conducting tube, and means to cause the conduction of only the first of said tubes in response to the first impulse.

6. In a signaling system, means for generating positive impulses, a chain of gas-filled tubes for counting said impulses, each tube comprising a cathode and a main anode and a starter electrode, means for applying said impulses simultaneously to the starter electrode circuits of all of said tubes, each tube having its cathode connected to negative potential through a cathode load individual to said tube and having its main anode connected to positive potential through an anode load common to all tubes, a dry rectifier connected between the cathode of each tube and the starter electrode circuit of the next succeeding tube, said rectifiers being so poled as to offer a low impedance shunt to said impulses when said rectifiers are connected to cathodes of non-conducting tubes, means including said cathode loads and effective upon conduction by each tube to increase the shunt impedance to said impulses of the rectifier connected to the cathode of said conducting tube, and means to cause the conduction of only the first of said tubes in response to the first impulse.

7. In a signaling system, means for generating positive impulses, a chain of gas-filled tubes for counting said impulses, each tube comprising a cathode and a main anode and a starter electrode, means for applying said impulses simultaneously to the starter electrode circuits of all of said tubes, each tube having its cathode connected to negative potential through a cathode load individual to said tube and having its main anode connected to positive potential through an anode load common to all tubes, a dry rectifier connected between the cathode of each tube and the starter electrode circuit of the next succeeding tube, said rectifiers being so poled as to offer a low impedance shunt to said impulses when said rectifiers are connected to cathodes of non-conducting tubes, means including said cathode loads and effective upon conduction by each tube to increase the shunt impedance to said impulses of the rectifier connected to the cathode of said conducting tube, means to cause the conduction of only the first of said tubes in response to the first impulse, and means including said common main anode load for extinguishing a conducting tube when the next succeeding tube conducts.

8. In a signaling system, means for generating positive impulses, a chain of gas-filled tubes for counting said impulses, each tube comprising a cathode and a main anode and a starter electrode, means for applying said impulses simultaneously to the starter electrode circuits of all of said tubes, each tube having its cathode connected to negative potential through a cathode load individual to said tube, an asymmetric resistance connected between the cathode of each tube and the starter electrode circuit of the next succeeding tube, said resistances being so poled as to offer a low impedance shunt to said impulses when said resistances are connected to cathodes of non-conducting tubes thereby preventing conduction by tubes next succeeding said non-conducting tubes in response to an impulse, means including said cathode loads and effective upon conduction by each tube to increase the shunt impedance to said impulses of the resistance connected to the cathode of said conducting tube thereby permitting the tube next succeeding said conducting tube to conduct responsive to an impulse, and means to cause the conduction of only the first of said tubes in response to the first impulse.

9. In a signaling system, means for generating positive impulses, a chain of gas-filled tubes for counting said impulses, each tube comprising a cathode and a main anode and a starter electrode, means for applying said impulses simultaneously to the starter electrode circuits of all of said tubes, each tube having its cathode connected to negative potential through a cathode load individual to said tube, an asymmetric resistance connected between the cathode of each tube and the starter electrode circuit of the next succeeding tube, said resistances being so poled as to offer a low impedance shunt to said impulses when said resistances are connected to cathodes of non-conducting tubes thereby preventing conduction by tubes next succeeding said non-conducting tubes in response to an impulse, means including said cathode loads and effective upon conduction by each tube to increase the shunt impedance to said impulses of the resistance connected to the cathode of said conducting tube thereby permitting the tube next succeeding said conducting tube to conduct responsive to an impulse, means to cause the conduction of only the first of said tubes in response to the first impulse, and means including said common main anode load for extinguishing a conducting tube when the next succeeding tube conducts.

10. In a coupling device including a diode, a source of varying potential comprising an operable electronic trigger, means for operating said trigger, means including a resistor for applying a potential from said trigger to one electrode of said diode, a source of varying control potential, means for applying said control potential to the other electrode of said diode, means including a capacitor connected to an electrode of said diode for delivering an operating voltage upon a change in the value of said control voltage.

11. In a coupling device including a diode, a source of varying potential, a resistance capacitance network, means connecting said source to one end of said network, means connecting one electrode of said diode intermediate said resistance capacitance network, a second source of varying potential, and means applying said second potential to the other electrode of said diode whereby an output is obtained at the other end of said resistance capacitance network under control of said varying potentials.

12. A stepping register comprising a series of bistable trigger elements, means for connecting said trigger elements in cascade and including an alternating current coupled diode and means for stepping the electrical "on" condition of one trigger element to a succeeding or succeeding trigger elements comprising a source of varying potential and means for applying said potential to one electrode of all of said diodes.

13. A stepping register comprising a series of electronic triggers, means for connecting said triggers in cascade and including a diode, alternating current coupled to the control elements of all triggers, except the first, and means connecting an output circuit of each preceding trigger, including said first trigger, to one electrode of a diode of the succeeding trigger.

14. A gaseous discharge tube counting chain of the type which is responsive to pulses received over a common supply lead and comprising a plurality of consecutive gas tubes in a chain, a common pulse supply lead, a coincidence gate circuit between each pair of consecutive tubes in said chain, each said gate circuit interconnecting the cathode of the first tube of a pair and the trigger electrode of the second tube of the pair and the common supply lead in such a way that the second tube of a pair has a pulse supply applied to it and fires when coincidence occurs between discharge of the first tube of a pair and a pulse on said common supply lead.

15. A gaseous discharge tube counting chain comprising a plurality of tubes, a common supply lead over which pulses of positive potential are supplied, a separate resistance-capacitance time constant circuit in the cathode circuit of each said tube, a rectifier coincidence gate network between each pair of consecutive tubes in the chain, each said gate network interconnecting the cathode circuit of the first tube of a pair and the trigger electrode of the second tube of the pair and the common supply lead in such a way that the second tube of the pair has a pulse applied to it and fires when coincidence occurs between said first tube discharging and the receipt of a pulse of positive potential on said common supply lead, and means including said time constant circuit whereby the first tube of the pair is extinguished when the second tube of the pair is fired.

References Cited in the file of this patent

UNITED STATES PATENTS

| | | |
|---|---|---|
| 2,373,134 | Massonneau | Apr. 10, 1945 |
| 2,426,278 | Mumma | Aug. 26 ,1947 |
| 2,502,443 | Dunn et al. | Apr 4, 1950 |
| 2,580,771 | Harper | Jan. 1, 1952 |